Patented Feb. 3, 1925.

1,525,117

UNITED STATES PATENT OFFICE.

ROBERT G. CASWELL AND ELLSWORTH G. MARSHALL, OF WILMINGTON, DELAWARE, ASSIGNORS TO E. I. DU PONT DE NEMOURS & COMPANY, OF WILMINGTON, DELAWARE, A CORPORATION OF DELAWARE.

HALOGENATED ISOVIOLANTHRENE AND PROCESS OF MAKING SAME.

No Drawing. Application filed November 6, 1920. Serial No. 422,243.

*To all whom it may concern:*

Be it known that we, ROBERT G. CASWELL and ELLSWORTH G. MARSHALL, citizens of the United States, and residents of Wilmington, in the county of New Castle and State of Delaware, have invented a certain new and useful Halogenated Isoviolanthrene and Process of Making Same, of which the following is a specification.

This invention relates to halogenated isoviolanthrenes, and comprises, as a new process, the chlorination of isoviolanthrene while in suspension in chlorobenzene, and, as a new composition of matter, the product immediately resulting from this chlorination.

According to the previously known process isoviolanthrene was chlorinated while suspended in nitrobenzene. This old procedure is not satisfactory for several reasons, among which there may be mentioned the low yield (50%) of halogenated violanthrene and the poisonous character of the nitro-benzene.

We have now discovered that the chlorination may be greatly improved, and a remarkable increase in yield obtained, by suspending the isoviolanthrene in a chlorobenzene. By "a chlorobenzene" we have reference principally to mono-chlorobenzene, but include also the several isomeric dichlorobenzenes, and any mixtures of these various chlorobenzenes, all of which may be referred to generically as chlorobenzenes whose molecules have less than three atoms of chlorine.

Our process possesses three distinct advantages over the "nitrobenzene process", namely (1) the elimination of the use of nitrobenzene, which is undesirable because of its marked toxic properties; (2) rapidity of filtration and completeness of washing of the resulting dye on the filter, which conditions, we believe, are not attainable in the nitrobenzene process; and (3) a yield of 70% of the theory as against a yield of 50% by the nitrobenzene process.

An important difference between our process and the old process exists in the amount of halogen which must be introduced into the isoviolanthrene in order that the dye which is to be ultimately formed will have the desired red shade. The chlorinated isoviolanthrene made according to the old process (that is, using nitrobenzene as the suspension medium) is, according to the published description of the process, a dichlor derivative, the theoretical chlorine content of which is calculated as 13.52%. To secure a dye having the desired reddish shade by our process using mono-chlorobenzene, the chlorination must apparently be continued until the chlorine content is substantially above 14%, and usually between 19 and 21%.

The following specific example will serve to illustrate our invention in greater detail:—

Fifty (50) parts by weight of finely ground isoviolanthrene are suspended in six hundred (600) parts of monochlorobenzene with agitation. Into this suspension, heated to 55° C., a stream of gaseous chlorine is passed until a test portion of the resulting chlorinated isoviolanthrene gives on analysis 19.5–20.5% chlorine. The dye is then filtered, washed on the filter with benzene, and dried at or below 70° C. The yield is forty (40) parts of chlorinated isoviolanthrene.

Various changes may, of course, be made in the various conditions of operation set forth in the above example. Thus the ratio of the quantity of isoviolanthrene to the quantity of chlorobenzene may be varied considerably. The temperature is such as may be obtained with a water bath, that is, from about 30 to 100° C., and preferably between 50 and 60° C. For certain purposes the chlorine supply may be stopped before the chlorine content of the resulting chloro-derivative reaches 19%.

When the suspension medium used is dichlorobenzene or a mixture of monochlorobenzene and nitrobenzene the amount of chlorine required to give the desired reddish shade is less than 19%, but in these cases the yield is also reduced. An idea of the different amounts of chlorine required with different suspension mediums to give the standard reddish shade may be gained from the following table:—

| Medium used | Per cent yield of chlorinated isoviolanthrene | Per cent chlorine content of powder |
|---|---|---|
| (1) Mono-chlor-benzene | 69.5 | 19.5–21.0 |
| (2) Mixture of ortho and meta-dichlor-benzene | 69.0 | 17.5–18.5 |
| (3) Mixture of four parts mono-chlor-benzene and one part nitrobenzene | 69.0 | 16.0–17.0 |
| (4) Mixture of one part mono-chlor-benzene and one part nitrobenzene | 61.0 | 13.0–14.0 |

The product obtained by the specific example given above is ordinarily converted into the marketable form of a dye paste by treatment with sulphuric acid. The new dye dyes cotton substantively giving blue shades which on exposure to air turn reddish violet of great fastness to light, soap, and hypochlorite bleaching solution. The dye is insoluble in hydrochloric acid and in caustic soda solution, but it is soluble in concentrated sulphuric acid, forming a blue solution, and its hydrosulphite vat is also blue. The new dye may be recrystallized from boiling nitrobenzene.

Although we prefer to use mono- or dichlorobenzenes undiluted by other liquids, it will be understood that our invention covers suspension mediums composed either of chlorobenzenes alone or chlorobenzenes mixed with other liquids, such as nitrobenzene, which undergo but little if any chemical alteration during the chlorination of the isoviolanthrene.

We claim:—

1. The process of producing a halogen derivative of isoviolanthrene which comprises halogenating isoviolanthrene while in suspension in a chlorobenzene having less than three chlorine atoms.

2. The process of producing a chlorine derivative of isoviolanthrene which comprises suspending isoviolanthrene in a chlorobenzene having less than three chlorine atoms and treating the resulting suspension with a chlorinating agent.

3. The process of producing a chlorine derivative of isoviolanthrene which comprises passing gaseous chlorine into a suspension of isoviolanthrene in a chlorobenzene having less than three chlorine atoms.

4. The process of producing a chlorine derivative of isoviolanthrene which comprises passing gaseous chlorine into a suspension of isoviolanthrene in mono-chlorobenzene.

5. The process of chlorinating isoviolanthrene which comprises treating isoviolanthrene with chlorine in the presence of a liquid composed principally of a chlorobenzene having less than three chlorine atoms until the chlorine content of the resulting isoviolanthrene derivative is greater than 14%.

6. The process of chlorinating isoviolanthrene which comprises treating isoviolanthrene with chlorine in the presence of a liquid composed principally of mono-chlorobenzene until the chlorine content of the resulting isoviolanthrene derivative is greater than 14%.

7. The process of chlorinating isoviolanthrene which comprises suspending isoviolanthrene in mono-chlorobenzene, and treating the resulting suspension with gaseous chlorine until the chlorine content of the isoviolanthrene derivative formed is between 19 and 21%.

8. The process of producing a halogen derivative of isoviolanthrene which comprises halogenating isoviolanthrene at a temperature between 30 and 100° C. while in suspension in a chlorobenzene having less than three chlorine atoms.

9. The process of producing a halogen derivative of isoviolanthrene which comprises halogenating isoviolanthrene at a temperature between 50 and 60° C. while in suspension in a chlorobenzene having less than three chlorine atoms.

10. The process of producing a chlorine derivative of isoviolanthrene which comprises passing gaseous chlorine into a suspension of isoviolanthrene in a chlorobenzene having less than three chlorine atoms while maintaining the temperature between 30 and 100° C.

11. The process of producing a chlorine derivative of isoviolanthrene which comprises passing gaseous chlorine into a suspension of isoviolanthrene in monochlorobenzene while maintaining the temperature between 30 and 100° C.

12. The process of chlorinating isoviolanthrene which comprises treating isoviolanthrene at a temperature between 30 and 100° C. with chlorine in the presence of a liquid composed principally of mono-chlorobenzene until the chlorine content of the resulting isoviolanthrene derivative is greater than 14%.

13. The process of chlorinating isoviolanthrene which comprises treating isoviolanthrene at a temperature between 30 and 100° C. with chlorine in the presence of a liquid composed principally of mono-chlorobenzene until the chlorine content of the resulting isoviolanthrene derivative is between 19 and 21%.

14. The process of producing a chlorine derivative of isoviolanthrene which comprises passing gaseous chlorine into a suspension of isoviolanthrene in a chlorobenzene having less than three chlorine atoms maintained at a temperature between 50 and 60° C.

15. The process of chlorinating isoviolanthrene which comprises treating isoviolanthrene at a temperature between 50 and 60°

C. with chlorine in the presence of a liquid composed principally of a chlorobenzene having less than three chlorine atoms until the chlorine content of the resulting isoviolanthrene derivative is greater than 14%.

16. The process of chlorinating isoviolanthrene which comprises treating isoviolanthrene at a temperature between 50 and 60° C. with chlorine in the presence of a liquid composed principally of mono-chlorobenzene until the chlorine content of the resulting isoviolanthrene derivative is greater than 14%.

17. The process of chlorinating isoviolanthrene which comprises treating isoviolanthrene at a temperature between 50 and 60° C. with chlorine in the presence of a liquid composed principally of mono-chlorobenzene until the chlorine content of the resulting isoviolanthrene derivative is between 19 and 21%.

18. The process which comprises suspending 1 part of isoviolanthrene in about 12 parts of mono-chlorobenzene, passing gaseous chlorine into the resulting suspension, while maintaining the temperature thereof at about 55° C., until the chlorine content of the isoviolanthrene derivative formed is between 19.5 and 20.5%, filtering the mixture, washing the residue with benzene, and drying the residue at a temperature at, or below, 70° C.

19. As a new composition of matter, a chlorinated isoviolanthrene containing more than 14% of chlorine.

20. As a new composition of matter, a chlorinated isoviolanthrene containing between 19 and 21% of chlorine.

21. As a new composition of matter, a chlorinated isoviolanthrene obtainable by treating with gaseous chlorine a chlorobenzene suspension of isoviolanthrene until the chlorine content of the resulting isoviolanthrene derivative becomes more than 16%, said chlorinated isoviolanthrene, when purified and treated with dilute sulphuric acid to form a paste, constituting a valuable dye insoluble in hydrochloric acid and in caustic soda, but dissolving in concentrated sulphuric acid with a blue coloration, and forming with hydrosulphite a blue vat substantively dyeing cotton blue shades which on exposure to air turn a reddish violet of great fastness to light, washing, and bleaching.

In testimony whereof we affix our signatures.

ROBERT G. CASWELL.
ELLSWORTH G. MARSHALL.